United States Patent
Benhammadi

(10) Patent No.: US 12,542,663 B2
(45) Date of Patent: Feb. 3, 2026

(54) METHOD FOR STORING A KEY IN A NON-VOLATILE MEMORY

(71) Applicant: STMicroelectronics International N.V., Geneva (CH)

(72) Inventor: Jawad Benhammadi, Pont de Claix (FR)

(73) Assignee: STMicroelectronics International N.V., Geneva (CH)

( * ) Notice: Subject to any disclaimer, the term of this patent is extended or adjusted under 35 U.S.C. 154(b) by 195 days.

(21) Appl. No.: 18/430,894

(22) Filed: Feb. 2, 2024

(65) Prior Publication Data
US 2024/0267217 A1    Aug. 8, 2024

(30) Foreign Application Priority Data
Feb. 3, 2023    (FR) ........................... 2301053

(51) Int. Cl.
*H04L 9/08*    (2006.01)

(52) U.S. Cl.
CPC .................. *H04L 9/0894* (2013.01)

(58) Field of Classification Search
CPC . H04L 9/0894; G11C 2029/4402; G11C 7/24; G11C 13/0059; G11C 13/0064; G11C 16/3459; G11C 29/40; G11C 29/52; G11C 16/22; G06F 21/79
See application file for complete search history.

(56) References Cited

U.S. PATENT DOCUMENTS

| | | | |
|---|---|---|---|
| 2010/0287426 A1* | 11/2010 | Kanai ................ | G11C 29/48 710/22 |
| 2018/0329776 A1* | 11/2018 | Lai .................. | G06F 11/1048 |
| 2019/0214102 A1 | 7/2019 | Park et al. | |
| 2019/0236031 A1 | 8/2019 | Kim | |
| 2020/0364110 A1* | 11/2020 | Lai .................. | G06F 11/1048 |

OTHER PUBLICATIONS

INPI Search Report and Written Opinion for priority application, FR Appl. No. 2301053, report dated Sep. 14, 2023, 8 pgs.

* cited by examiner

*Primary Examiner* — Abdulkader M Alriyashi
(74) *Attorney, Agent, or Firm* — Crowe & Dunlevy LLC

(57) ABSTRACT

A method is presented for verifying a writing of a key into a non-volatile memory. A first cyclic redundancy code of the key is stored into a register of an interface of the memory. A second cyclic redundancy code is computed on a message formed by the copied key having the first cyclic redundancy code linked thereto. The writing of the key into the non-volatile memory is considered as valid when the second cyclic redundancy code is equivalent to the zero value.

21 Claims, 4 Drawing Sheets

METHOD FOR STORING A KEY IN A NON-VOLATILE MEMORY

PRIORITY CLAIM

This application claims the priority benefit of French Application for Patent No. 2301053, filed on Feb. 3, 2023, the content of which is hereby incorporated by reference in its entirety to the maximum extent allowable by law.

TECHNICAL FIELD

The present disclosure generally concerns methods of writing a key into a non-volatile memory (NVM) and the associated electronic circuits.

BACKGROUND

In an electronic circuit, certain digital codes forming keys, called security keys, must be written and stored into a non-volatile memory and made inaccessible from the outside of the circuit. In other words, these keys are likely to be manipulated by the integrated circuit where they are located but must not be able to be extracted from this circuit. However, on manufacturing, and more particularly during a phase of personalization of the circuit, these keys are transferred into the circuit. It is necessary to verify that the writing has correctly occurred. There exist verification methods but they cause a decrease of the security.

There exists a need for a method of writing a key into a non-volatile memory enabling to verify that the key has been correctly written while maintaining the security level.

There is a need to overcomes all or part of the disadvantages of known methods of writing a key into a non-volatile memory.

SUMMARY

An embodiment provides a method of verification of a writing of a security key into a non-volatile memory comprising the following steps: storing in a register of an interface of said memory a first cyclic redundancy code of said security key, precomputed; writing the security key into a zone of the non-volatile memory; copying the security key written into said zone into a second register of said interface; computing a second cyclic redundancy code on a message formed by the copied security key having the first cyclic redundancy code linked thereto; and when the second cyclic redundancy code is equivalent to the zero value, considering the writing of the security key into said non-volatile memory as valid.

In an embodiment, when the second cyclic redundancy code is not equivalent to the zero value, then one of the steps is not valid.

An embodiment provides a method of writing a security key into a non-volatile memory of an integrated circuit comprising at least one interface of communication with the outside of the circuit, comprising the steps of: transferring from the outside of the circuit: a security key into a second register of an interface of the non-volatile memory; and a first precomputed cyclic redundancy code into a first register of said interface; computing a result of a third cyclic redundancy code on a message formed by the security key having the first precomputed cyclic redundancy code linked thereto; and when the third cyclic redundancy code is equivalent to zero, then the writing of the security key into the second register is considered as valid and is followed by the steps of the above method.

In an embodiment, when the third cyclic redundancy code is not equivalent to the zero value, then one of said steps is not valid.

In an embodiment, the second and/or the third cyclic redundancy code equivalent to the zero value is 0x00.

In an embodiment, the security key is coded over 128 bits.

In an embodiment, the cyclic redundancy codes are coded over 8 or 16 bits.

In an embodiment, the second register is configured to be non-readable except for a transfer from the interface to the memory and the other way.

In an embodiment, the non-volatile memory is a FLASH memory.

An embodiment provides an electronic circuit configured to implement such a method.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for the understanding of the described embodiments have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "front", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

Figure 1:
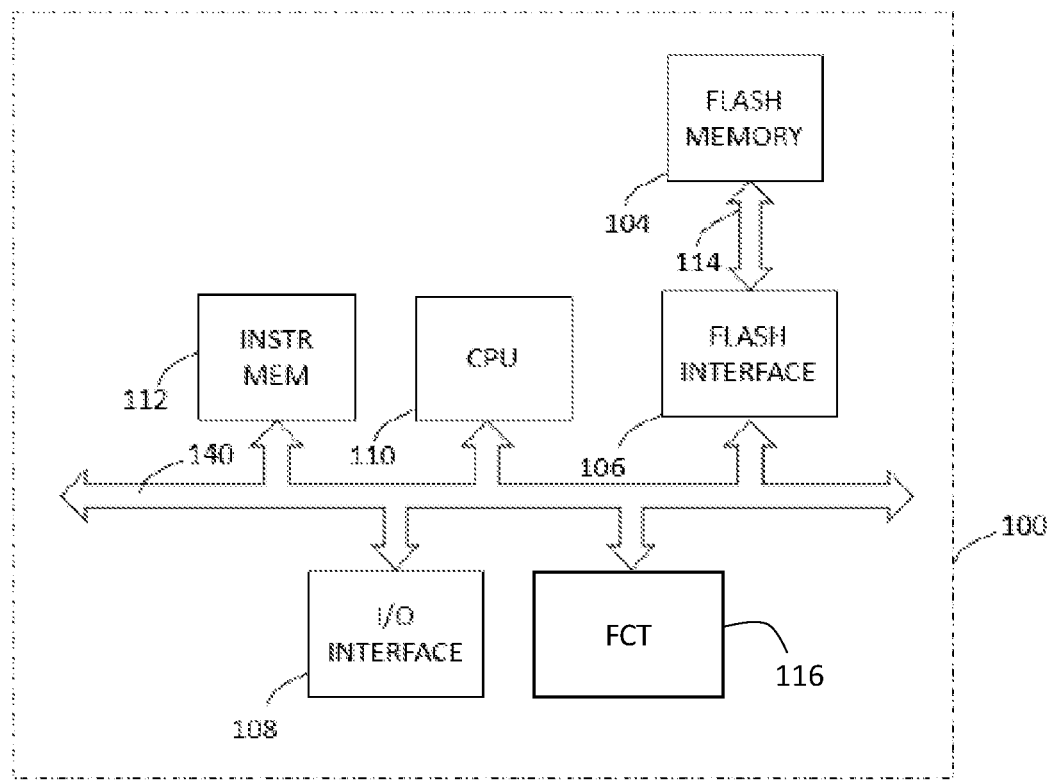
FIG. 1 shows an example of an integrated circuit of the type to which the described embodiments apply.

FIG. 1 shows an example of an integrated circuit 100 of the type to which the described embodiments apply.

Device 100 comprises a non-volatile memory 104 (FLASH MEMORY), for example of FLASH memory type, capable of communicating, via a communication bus 114, with a non-volatile memory interface 106 (FLASH INTERFACE) configured to write or read data into and from non-volatile memory 104.

Device 100 further comprises, for example, a processing unit 110 (CPU) comprising one or a plurality of processors under control of instructions stored in an instruction memory 112 (INSTR MEM). Instruction memory 112 is, for example, of random access type (RAM). Processing unit 110 and memory 112 communicate, for example, via a system (data, address, and control) bus 140. FLASH memory 104 is coupled to system bus 140 via non-volatile memory interface 106 and via bus 114. Device 100 further comprises an input/output interface 108 (I/O interface) coupled to system bus 140 to communicate with the outside.

Device 100 may integrate other circuits implementing other functions (for example, one or a plurality of volatile and/or non-volatile memories, other processing units), symbolized by a block 116 (FCT) in FIG. 1.

The described embodiments concern the writing of a key, for example a security key, into non-volatile memory 104 or a zone thereof, via a transfer of this key from the interface 106 where this key is stored into a write-only memory or register (not readable from bus 140). When the key is transferred from interface 106 to memory 104, the corresponding zone of memory 104 can no longer be read from the outside (via bus 140).

A difficulty lies in the need to ensure that the key can be transferred, with no error, into memory 104 without for this key to need to be read therein for verification through an interface accessible from the outside of the circuit.

Indeed, a solution would be to keep "open", that is, operational, a test interface which generally equips the circuit to access memory 104 after writing of the key and verify its consistency with the original key. However, it is conversely desired to deactivate the test interface before any key storage in the circuit to avoid a breach in the security of keys.

Typically, to verify that the writing of data has occurred with no error, without having to verify bit by bit, a hash procedure delivering a code of decreased size of this data element is used. One of the most current verification codes is the cyclic redundancy code (CRC). The CRC computing is generally performed in hardware fashion by a finite state machine and is added at the end of the data that it signs, and stored therewith. A CRC is characterized by its number of bits, which conditions its robustness in terms of error detection.

An example of application of the described embodiments concerns the writing of a key authorizing the unlocking (opening for an access from the outside) of the memory, for example for debugging purposes. In such a case, the key must have to be stored by the manufacturer in memory 104 without for it to be able to be taken out of the circuit.

According to the described embodiments, it is provided to perform the verification of a CRC linked to a key by a program of the interface 106 by storing this CRC in volatile fashion in interface 106. This verification is performed at least during its transfer from interface 106 to a dedicated zone of memory 104, and preferably at the same time during the storage of this key in this interface 106 and during its transfer from interface 106 to a dedicated zone of memory 104. The CRC of the key is thus not stored in the circuit but is delivered by the manufacturer or the personalization operator to the circuit.

Figure 2:
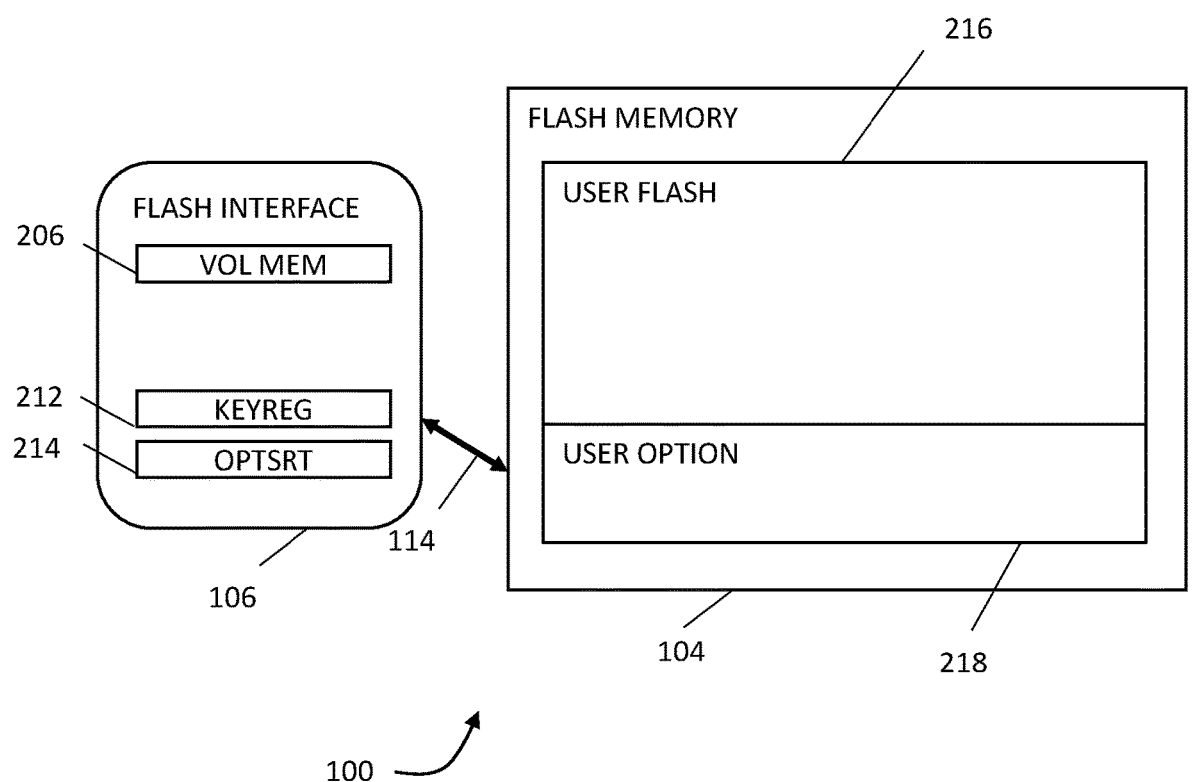
FIG. 2 schematically shows, partially and in the form of blocks, a device with a non-volatile memory according to an embodiment.

FIG. 2 schematically and partially shows in the form of blocks, a device with a non-volatile memory 100 according to an embodiment.

More particularly, the shown example illustrates an embodiment of non-volatile memory interface 106 and of non-volatile memory 104.

Non-volatile memory interface 106 comprises volatile storage registers 206 (VOL MEM), among which is a register dedicated to the storage of key(s) 212 (KEYREG), and a zone 214 which, after an instruction (OPTRST) has been executed, receives the copying by a state machine of the user option values.

According to an example, register 212 is configured to be rewritable and non-readable except for a transfer to and from memory 104. In other words, register 212 is not readable via bus 140, for example by microcontroller 110.

In the shown example, non-volatile memory 104, for example of flash type, comprises a first region 216 (USER FLASH) and a second region 218 (USER OPTION). Second region 218, for example, corresponds to a section of user option bytes.

Figure 3:
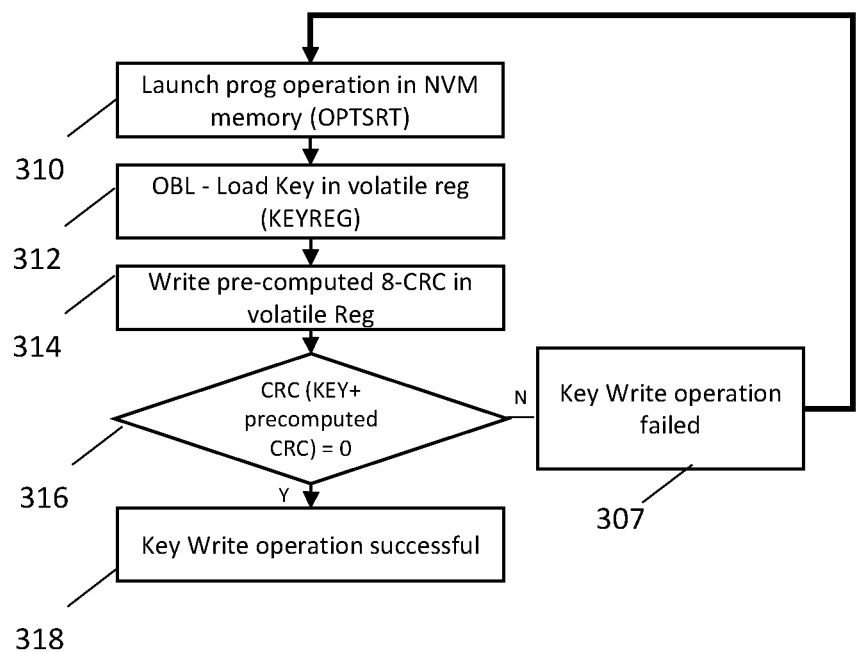
FIG. 3 shows, in the form of blocks, steps of an implementation mode of a method of verification of the writing of a key into a non-volatile memory.

FIG. 3 shows, in the form of blocks, steps of an implementation mode of a method of verification of the writing of a key into non-volatile memory 104 according to an embodiment.

The writing is illustrated by a step 310 (Launch prog operation in NVM memory (OPTSRT)) during which the key is transferred from interface 106, for example from register 212, to the dedicated zone 218 of FLASH memory 104, by the execution of instructions of a program contained in interface 106.

At a step 312 (OBL—Load Key in volatile reg (KEYREG)), the key is read from zone 218 and transferred, via bus 114, into the dedicated register 212 of interface 106. This transfer may correspond to the execution of instructions of loading of the user options stored in zone 218 (OBL, Option Byte Loading). The user option bytes are used to preconfigure non-volatile memory device 104 before the starting of the computing units, for example. These bytes are, for example, automatically loaded after a resetting or after a request originating from the program of interface 106.

At a step 314 (Write pre-computed 8-CRC in volatile Reg), a precomputed result of the CRC of the key is stored in one of registers 206. The precomputed CRC is coded, for example, over 8 bits or over 16 bits.

At a step 316 (CRC (KEY+precomputed CRC)=0), a second CRC is computed on a message formed by the key having the precomputed code linked thereto. The second code is computed by the same state machine as the precomputed code. Thus, if it has a zero value (0, or 0x0 for a byte), this signifies that the key written into memory 104 comprises no error. In this case (output branch Y of block 316), the key is considered as valid (block 318—Key Write operation successful). In the opposite case (branch N of block 316), the writing of the key is considered as invalid (block 307—Key Write operation failed). Step 307 is, for example, followed by a return to step 310 for a rewriting of the key into memory 104.

The method of FIG. 3 enables, due to the CRC computing performed on a message formed by the key having the CRC of this key linked thereto, to control that the writing of the key into the non-volatile memory is valid, without having to re-use the actual key, and while maintaining a security level identical to the security level of the actual security key. For example, if the key is coded over 128 bits, the security level of the key is maintained at 128 bits and is not affected by the number of bits of the CRC.

Figure 4:
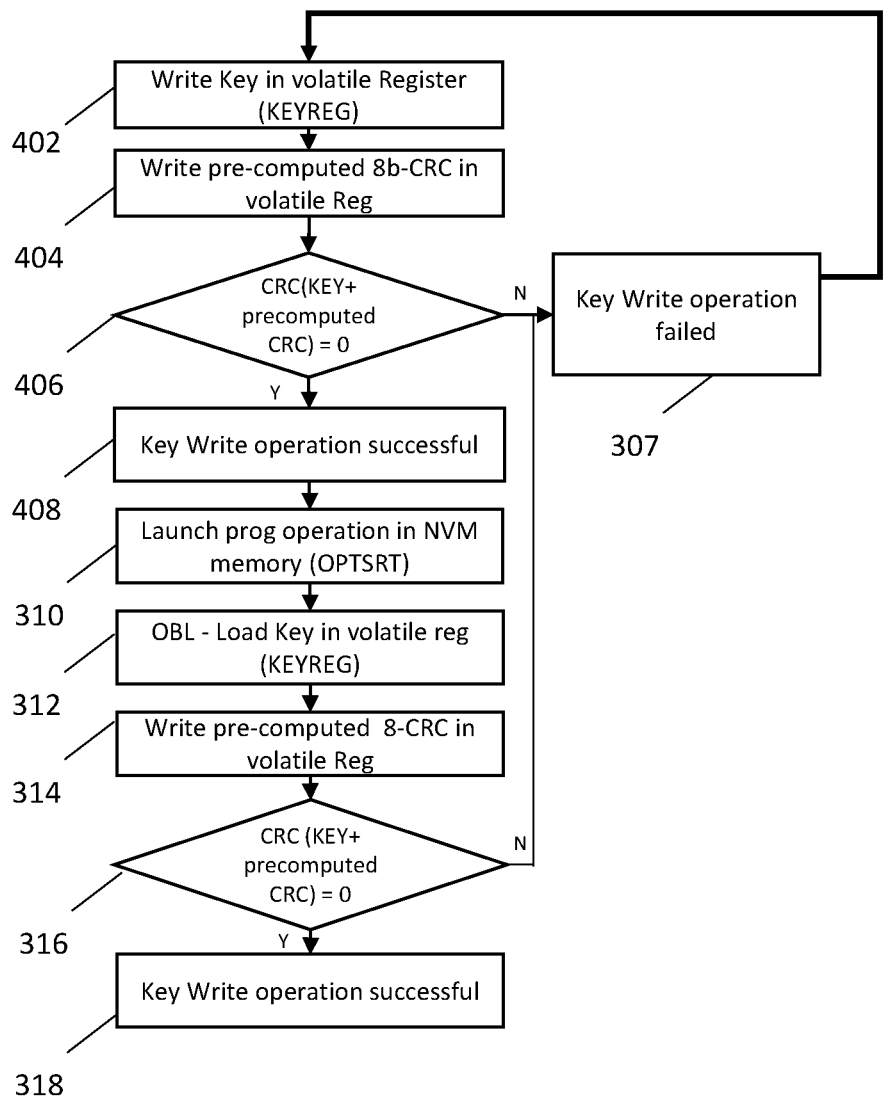
FIG. 4 shows, in the form of blocks, steps of an implementation mode of another method of verification of the writing of a key into a non-volatile memory.

FIG. 4 shows, in the form of blocks, steps of another implementation mode of a method of verification of the writing of a key into a non-volatile memory.

As compared with FIG. 3, FIG. 4 illustrates steps of verification of the writing of the key from the outside of the circuit into the dedicated register 212 of interface 106.

At a step 402 (Write Key in volatile Register (KEYREG)), the key is written, from the outside of the circuit, into register 212.

At a step 404 (Write pre-computed 8b-CRC in volatile Reg), a precomputed result of the CRC of the key written at step 402 is stored in one of the registers 206 of interface 106. The precomputed CRC is coded, for example, over 8 bits or over 16 bits. This precomputed result is, for example loaded, at the same time as the key, from the outside of the circuit (to be verified).

At a step 406 (CRC (KEY+precomputed CRC)=0), a second CRC is computed on a message formed by the key having the precomputed code linked thereto. The second code is computed by the same state machine as the precomputed code. Thus, if it has a zero value (0, or 0x0 for a byte), this signifies that the key written into register 212 comprises no error. In this case (output branch Y of block 406), the key is considered as valid (block 408—Key Write operation successful). In the opposite case (branch N of block 406), the writing of the key is considered as invalid (block 307—Key Write operation failed).

After step 408, the method is similar to that of the example of FIG. 3 starting from step 310.

The writing method of FIG. 4 enables, due to the cyclic redundancy code performed on a message formed by the security key having the precomputed code linked thereto, to control that the writing of the security key into the second register 212 is valid before the latter is written into zone 218 of non-volatile memory 104 while maintaining a security level identical to the security level of the actual security key.

Various embodiments and variants have been described. Those skilled in the art will understand that certain features of these various embodiments and variants may be combined, and other variants will occur to those skilled in the art. In particular, non-volatile memory 104 is for example a FLASH memory but those skilled in the art may envisage other types of non-volatile memories such as phase-change memories.

Finally, the practical implementation of the described embodiments and variants is within the abilities of those skilled in the art based on the functional indications given hereabove. In particular, even if the examples are described for a 128-bit security key and 8-bit cyclic redundancy codes, those skilled in the art may implement security keys coded over a larger or smaller number of bits, provided for the validity of the writing of the key during steps 316 or 406 to be equivalent to the obtaining of the zero value of the cyclic redundancy code performed on a message formed by the copied security key having the precomputed code linked thereto.

The invention claimed is:

1. A method for verifying a writing of a key into a non-volatile memory, comprising the steps of:
   storing a first precomputed cyclic redundancy code of said key in a register of an interface of said non-volatile memory;
   writing the key into a zone of the non-volatile memory;
   copying the key which was written into said zone into a second register of said interface;
   computing a second cyclic redundancy code on a message formed by the copied key having the first cyclic redundancy code linked thereto; and
   considering the writing of the key into said non-volatile memory as valid when the second cyclic redundancy code is equivalent to a zero value.

2. The method according to claim 1, further comprising considering one of the foregoing steps as not valid when the second cyclic redundancy code is not equivalent to the zero value.

3. The method according to claim 1, wherein the second cyclic redundancy code equivalent to the zero value is 0x00.

4. The method according to claim 1, wherein the key is coded over 128 bits.

5. The method according to claim 1, wherein the cyclic redundancy code is coded over 8 bits.

6. The method according to claim 1, wherein the cyclic redundancy code is coded over 16 bits.

7. The method according to claim 1, further comprising configuring the second register to be non-readable except for a transfer from the interface to the memory and a transfer from the memory to the interface.

8. The method according to claim 1, wherein the non-volatile memory is a FLASH memory.

9. An electronic circuit configured to implement the method according to claim 1.

10. A method of processing a key with respect to a non-volatile memory of an integrated circuit comprising at least an interface of communication with the outside of the integrated circuit, comprising steps of:
    writing, from outside of the integrated circuit, a key into a second register of an interface of the non-volatile memory;
    writing, from the outside the integrated circuit, a first precomputed cyclic redundancy code into a first register of said interface;
    computing a result of a third cyclic redundancy code on a message formed by the key having the first precomputed cyclic redundancy code linked thereto; and
    considering writing of the security key into the second register as valid when the third cyclic redundancy code is equivalent to a zero value.

11. The method according to claim 10, further comprising:
    writing the key into a zone of the non-volatile memory; and
    verifying the writing of the key into the non-volatile memory.

12. The method according to claim 11, wherein verifying comprises steps of:
    copying the key written into said zone into the second register of said interface;
    computing a second cyclic redundancy code on a message formed by the copied key having the first cyclic redundancy code linked thereto; and
    considering the writing of the key into said non-volatile memory as valid when the second cyclic redundancy code is equivalent to a zero value.

13. The method according to claim 12, wherein each of the second and the third cyclic redundancy codes equivalent to the zero value is 0x00.

14. The method according to claim 10, further comprising considering one of said steps as not valid when the third cyclic redundancy code is not equivalent to the zero value.

15. The method according to claim 10, wherein the third cyclic redundancy code equivalent to the zero value is 0x00.

16. The method according to claim 10, wherein the key is coded over 128 bits.

17. The method according to claim 10, wherein the cyclic redundancy codes are coded over 8 bits.

18. The method according to claim 10, wherein the cyclic redundancy codes are coded over 16 bits.

19. The method according to claim 10, further comprising configuring the second register to be non-readable except for a transfer from the interface to the memory and a transfer from the memory to the interface.

20. The method according to claim 10, wherein the non-volatile memory is a FLASH memory.

21. An electronic circuit configured to implement the method according to claim 10.

* * * * *